Patented Oct. 16, 1928.

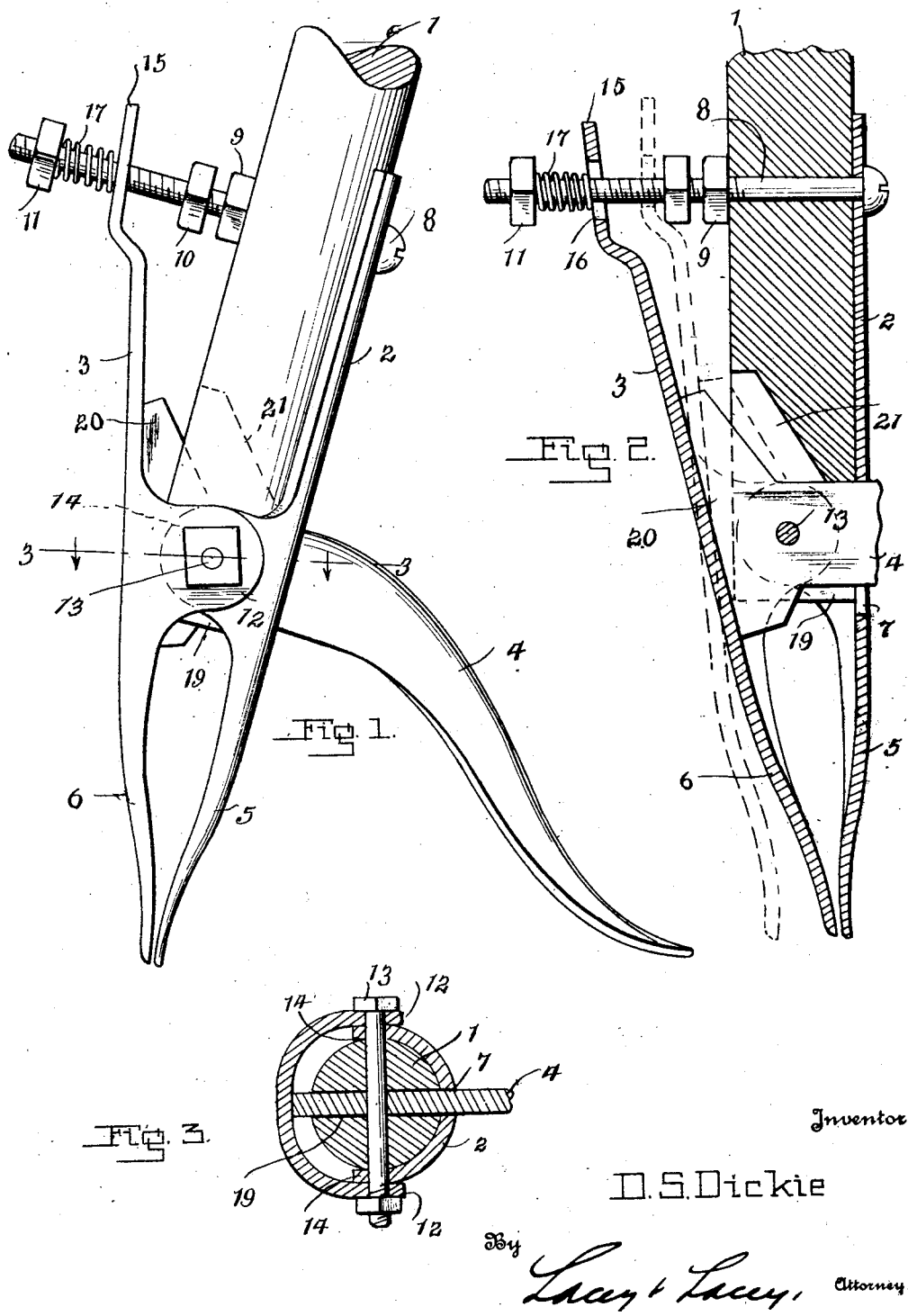

1,687,974

UNITED STATES PATENT OFFICE.

DAVID S. DICKIE, OF SEATTLE, WASHINGTON.

WEED PULLER.

Application filed November 9, 1926. Serial No. 147,332.

This invention provides an implement for eradicating obnoxious plants by extirpation without crushing the tops of the plants to an extent to cause the implement to slip or operate imperfectly.

The invention provides means for limiting the movements of the pivoted jaw and to enable replacements being easily and cheaply made, since the jaw operating lever is a separate and distinct part.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of a weed puller embodying the invention, the upper portion of the handle being broken away and the jaws being illustrated in closed position.

Figure 2 is a view similar to Figure 1, the parts being in section, and

Figure 3 is a sectional view on the line 3—3 of Figure 1.

Corresponding and like parts are referred to in the following description and designated in the several views of the drawings by like reference characters.

The implement comprises a handle 1, a fixed member 2, a pivoted member 3, and a jaw operating lever 4. The members 2 and 3 are disposed upon opposite sides of the lower end of the handle 1, and project to provide complemental jaws 5 and 6, between which the objectionable growth or weed is adapted to be gripped when extirpating the same. The member 2 is secured fast to a side of the handle 1 and has a longitudinal slot 7 formed therein intermediate its ends for the reception of the pivotal end of the lever 4. A bolt 8 passes through registering openings formed in the member 2 and handle 1 and is of a length to project some distance beyond the opposite side of the handle, the projecting portion being threaded to receive nuts 9, 10, and 11. The nut 9, in conjunction with the head of the bolt, clamps the upper end of the member 2 against the side of the handle 1. The nuts 10 and 11 constitute stops to limit the movement of the pivoted jaw and member 3.

The member 3 is formed with spaced ears 12 which embrace opposite sides of the handle and which are apertured to receive a bolt 13 which passes transversely through the lower portion of the handle 1. The member 2 is formed with spaced ears 14 which also embrace opposite sides of the handle 1 and which are apertured to receive the bolt 13. The ears 12 and 14 overlap and are located about midway between the upper and lower ends of the members. The jaws 5 and 6 are fashioned to readily penetrate the soil and engage opposite sides of the roots of the plants to be extirpated. The jaws normally stand apart and are brought together when the upper end of the handle 1 is moved laterally to cause the outer end of the lever 4 to make contact with the ground. The upper portion of the member 3 is laterally offset to clear the nuts 9 and 10, as indicated at 15, and is formed with a longitudinal slot 16 to receive the outer end of the bolt 8. An open coil spring 17 is mounted upon the outer end of the bolt 8 between the offset end 15 of the member 3 and the nut 11 and operates to normally press the upper end of the member 3 towards the handle, whereby to maintain the jaws 5 and 6 separated. The opening of the jaws 5 and 6 is determined by adjustment of the nut 10 which functions as a stop to limit the inward movement of the offset end 15 of the member 3. The closing of the jaws is determined by the spring 17 and the position of the nut 11 which also functions as a stop to limit the outward movement of the upper end of the member 3 when the coils of the spring 17 close.

The jaw operating lever 4 is flat and curved throughout its length and twisted intermediate its ends to throw the latter at a right angle to each other so that the head or pivotal end of the lever may lie in a vertical plane whereas the lower end or foot of the lever may occupy a horizontal position to obtain an extended bearing upon the ground. The upper end of the lever 4 is apertured to receive the bolt 13 and is disposed in an open slot 19 formed transversely in the lower end of the handle 1, intermediate the sides thereof. A cross head 20 is formed upon the upper or pivotal end of the lever 4 and engages the inner side of the pivoted member 3. The cross head 20 extends upwardly and downwardly from the pivotal end of the lever to engage the member 3 both above and below a line perpendicular to the handle passing through the pivot 13 of both the member 3 and lever 4. A recess 21 is formed in a side of the handle 1 adjacent the upper portion of the cross head 20 to receive the same and thereby admit of the upper portion of the member 3 coming close to the side of the handle, as when the jaws are open.

As herein stated the jaws are normally spread and the major portion of the lever 4 projects laterally from the handle and curves downwardly towards the point of the jaws so that when the handle is held in upright position and the jaws are pressed into the ground upon opposite sides of the roots of a weed or other plant to be extracted, the outer end of the lever 4 will engage the ground at a distance from the lower end of the handle. When the handle is tilted towards that side provided with the lever 4 the latter is held in fixed position and through the upper portion of the cross head 20 presses the upper end of the member 3 outwardly and effects a closing of the jaws. The lever 4 also acts as a fulcrum and a continued movement of the handle 1 effects a lifting of the jaws with the plant gripped therebetween with the result that the weed, or other objectionable growth is extirpated. When the implement is lifted clear of the ground the spring 17, previously compressed in the closing of the jaws, operates to press the upper end of the member 3 inwardly and effect an opening of the jaws, whereby the plant is released and drops to the ground.

It is observed that the tool is adapted to effectually pull weeds, big or small, without mutilating a lawn unduly, by extracting unnecessary dirt with the weeds, and to be operated by hand pressure to handle in contradistinction to foot pressure to lever.

This is accomplished by reason of symmetry of jaws that penetrate the ground easily and the means that regulate the extent of the opening and closing of the jaw 6 and the extent of pressure of said jaw, upon the other jaw 5. In consequence, the tool can be adjusted to the different size weeds to be pulled, which determines the amount of dirt, that will be extracted with the weeds, and the extent of lawn mutilation. Also the effectual pulling of the weeds with roots, and the operation of the tool by hand pressure.

As the quantity of dirt extracted with weeds is determined by expansion of jaws, and the extent of mutilation of lawn by the quantity of dirt extracted with the weeds, it is therefore obvious, that the tool is highly practical and adapted for weeding new lawns with small weeds, or old lawns with big weeds, and with the least possible disfigurement of lawn.

Having thus described the invention, I claim:

1. A weed puller comprising a handle, a fixed member at one side of the handle extended at its lower end to provide a jaw, a pivoted member at the opposite side of the handle and extended at its lower end to provide a complemental jaw, said members having overlapping portions and the fixed member having an intermediate slot and the pivoted member having its upper end longitudinally slotted, a bolt passing through the handle, and the overlapping portions of the members, a lever passing through the slot of the fixed member and having a cross head at its pivotal end to engage the inner side of the pivoted member and mounted upon the bolt connecting the two members to the handle, a bolt passing through the upper end of the fixed member and projecting beyond the opposite sides of the handle, nuts mounted upon the projecting ends of the bolts, the latter passing through the upper slotted end of the pivoted member and an open coil spring mounted upon the bolt between the upper end of the pivoted member and the outer nut applied to the said bolt.

2. A weed puller comprising a handle, fixed and pivoted jaws mounted upon the handle, and a fulcrum member pivoted to the handle and having a cross head at its pivotal end engaging the pivoted jaw upon opposite sides of its pivot.

3. A weed puller comprising a handle, members upon opposite sides of the handle and projecting to form jaws, one of the members being pivoted, an operating lever for the pivoted member mounted upon the handle, a bolt passing through the handle and fixed member and across the upper end of the pivoted member, nuts upon the projecting end of the bolt and at opposite sides of the upper end of the pivoted member, and an open coil spring mounted upon the outer end of the bolt between the upper end of the pivoted member and the outer nut.

In testimony whereof I affix my signature.

DAVID S. DICKIE. [L. S.]